(12) United States Patent
Socci et al.

(10) Patent No.: US 10,308,860 B2
(45) Date of Patent: Jun. 4, 2019

(54) COMPOSITIONS AND METHODS FOR FILTER CAKE REMOVAL

(71) Applicant: ETHICAL SOLUTIONS, LLC, South Windsor, CT (US)

(72) Inventors: Daniel J. Socci, West Hartford, CT (US); Jennifer L. Holcomb, Torrington, CT (US)

(73) Assignee: Ethical Solutions LLC, South Windsor, CT (US)

( * ) Notice: Subject to any disclaimer, the term of this patent is extended or adjusted under 35 U.S.C. 154(b) by 0 days.

(21) Appl. No.: 15/175,812

(22) Filed: Jun. 7, 2016

(65) Prior Publication Data

US 2016/0362596 A1  Dec. 15, 2016

Related U.S. Application Data

(60) Provisional application No. 62/175,817, filed on Jun. 15, 2015, provisional application No. 62/232,984, filed on Sep. 25, 2015.

(51) Int. Cl.

| C09K 8/52 | (2006.01) |
|---|---|
| C09K 8/03 | (2006.01) |
| C09K 8/58 | (2006.01) |
| C09K 8/70 | (2006.01) |
| C09K 8/92 | (2006.01) |

(52) U.S. Cl.
CPC ............... *C09K 8/52* (2013.01); *C09K 8/03* (2013.01); *C09K 8/58* (2013.01); *C09K 8/706* (2013.01); *C09K 8/92* (2013.01); *C09K 2208/26* (2013.01)

(58) Field of Classification Search
None
See application file for complete search history.

(56) References Cited

U.S. PATENT DOCUMENTS

| 4,809,783 | A | | 3/1989 | Hollenbeck et al. | |
|---|---|---|---|---|---|
| 5,238,065 | A | * | 8/1993 | Mondshine | C09K 8/52 166/300 |
| 5,607,905 | A | | 3/1997 | Dobson, Jr. et al. | |
| 6,138,760 | A | * | 10/2000 | Lopez | C09K 8/52 166/280.1 |
| 6,861,394 | B2 | * | 3/2005 | Ballard | C09K 8/536 507/269 |

(Continued)

*Primary Examiner* — Angela M DiTrani Leff
(74) *Attorney, Agent, or Firm* — Ohlandt, Greeley, Ruggiero & Perle, L.L.P.

(57) ABSTRACT

Compositions for removing filter cake from a subterranean borehole and methods for degrading filter cake and filter cake removal are provided. The composition contains an encapsulated peroxygen (e.g., acrylic resin coated ammonium persulfate), a surfactant (e.g., nonionic surfactant), and optionally an unencapsulated peroxygen. The method (e.g., a one-step method) involves contacting the filter cake with the composition, and allowing the composition to remain in contact with the filter cake for a period of time sufficient to degrade the filter cake. The reaction of the composition with the filter cake results in acidic conditions, thereby eliminating any need for follow up acid treatments. The composition is stable enough to effectively remove filter cake at temperatures up to 250° F. or greater. Through filter cake removal, the method provides for increased flow, production, and/or recovery of oil and gas hydrocarbons from a subterranean formation.

17 Claims, 15 Drawing Sheets

| | Removal Efficicency |
|---|---|
| 0 hours | --- |
| 4 hours | 91% |
| 8 hours | 95% |
| 20 hours | 97% |

Removal Efficiency:  91%  95%  97%

(56) References Cited

U.S. PATENT DOCUMENTS

| | | | |
|---|---|---|---|
| 6,886,635 B2 | 5/2005 | Hossaini et al. | |
| 2004/0040706 A1* | 3/2004 | Hossaini | C09K 8/12 |
| | | | 166/278 |
| 2005/0126785 A1* | 6/2005 | Todd | C09K 8/52 |
| | | | 166/307 |
| 2008/0200354 A1* | 8/2008 | Jones | C09K 8/524 |
| | | | 507/244 |
| 2010/0270017 A1* | 10/2010 | Prasek | C09K 8/74 |
| | | | 166/300 |
| 2011/0061870 A1* | 3/2011 | Navarro-mascarell | |
| | | | C09K 8/524 |
| | | | 166/311 |
| 2011/0094747 A1* | 4/2011 | Mettath | C09K 8/528 |
| | | | 166/311 |
| 2015/0175871 A1* | 6/2015 | Mettath | C09K 8/03 |
| | | | 166/312 |

* cited by examiner

FIG. 1

| Additive | Description | Quantity |
|---|---|---|
| Escade 110 | Mineral Oil | 161.7 g |
| Magma Gel | Viscosifier Organophilic Clay (modified hectorite) | 4 g |
| Magma Gel SE | Viscosifier Organophilic Clay (organo-attapulgite) | 4 g |
| Lime | $Ca(OH)_2$ | 18.7 g |
| Carbo Mul HT | HT Primary Emulsifier (Polyamide/Mineral Oil Blend) | 10 g |
| Magma Vert | HT Secondary Emulsifier (Glycol Ether/Fatty Acid Blend) | 10 g |
| Deionized Water | Deionized Water | 16.3 g |
| Calcium Chloride | $CaCl_2$ (97%) | 10 g |
| Magma Seal | HT Filtration Control (Organophilic Lignite) | 16.7 g |
| Weighting Agent | $CaCO_3$ (50 um) | 40 g |

FIG. 2

| Properties | Berea Sandstone |
|---|---|
| Porosity, vol % | 18 |
| Permeability, md | 50 |
| Length, in. | 1 |
| Diameter, in. | 2.5 |

FIG. 3

| Temperature | 140°F |
|---|---|
| Differential pressure | 300 psi |
| Thickness of filter cake | 0.03 in |
| Weight of filter cake | 6.3 g |
| Brine (KCl) | 5 wt% |

|  | Removal Efficiency |
|---|---|
| 0 hours | -- |
| 4 hours | 84% |
| 8 hours | 87% |
| 20 hours | 94% |

Removal Efficiency:   84%   87%   94%

FIG. 5

|  | $Na^+$ (mg/L) | $K^+$ (mg/L) | $Mg^{2+}$ (mg/L) | $Ca^{2+}$ (mg/L) | $Fe^{2+/3+}$ (mg/L) | $Al^{3+}$ (mg/L) |
|---|---|---|---|---|---|---|
| 4 hours | 24235 | 4 | 0 | 0 | 0 | 0 |
| 8 hours | 24775 | 9 | 0 | 363.5 | 0 | 0 |
| 20 hours | 25730 | 13 | 0 | 595.5 | 0 | 0 |

FIG. 6

| | |
|---|---|
| Temperature | 190°F |
| Differential pressure | 300 psi |
| Thickness of filter cake | 0.042 in |
| Weight of filter cake | 9.2 g |
| Brine (KCl) | 5 wt% |

|  | Removal Efficiency |
|---|---|
| 0 hours | -- |
| 4 hours | 95% |
| 8 hours | 97% |
| 20 hours | 98% |

Removal Efficiency:   95%   97%   98%

FIG. 8

|  | Na$^+$ (mg/L) | Ca$^{2+}$ (mg/L) | Fe$^{2+/3+}$ (mg/L) |
|---|---|---|---|
| 4 hours | 27125 | 654.5 | 0 |
| 8 hours | 29945 | 698 | 0 |
| 20 hours | 17370 | 826 | 0 |

FIG. 9

| Temperature | 190°F |
| --- | --- |
| Differential pressure | 300 psi |
| Thickness of filter cake | 0.035 in |
| Weight of filter cake | 7.7 g |
| Brine (KCl) | 18 wt% |

|  | Removal Efficiency |
|---|---|
| 0 hours | -- |
| 4 hours | 90% |
| 8 hours | 97% |
| 20 hours | 98% |

Removal Efficiency:   90%      97%      98%

FIG. 11

|  | pH | $Ca^{2+}$ (mg/L) | $Mg^{2+}$ (mg/L) | $Na^+$ (mg/L) | $K^+$ (mg/L) | $Al^{3+}$ (mg/L) | $Fe^{2+/3+}$ (mg/L) |
|---|---|---|---|---|---|---|---|
| 0 hours | 2.34 | 0 | 0 | 89500 | 219.5 | 0 | 0 |
| 4 hours | 0.31 | 319 | 0 | 92250 | 249 | 0 | 130.5 |
| 8 hours | 0.39 | 585.5 | 0 | 94700 | 271 | 0 | 378 |
| 20 hours | 0.57 | 813.5 | 9.5 | 104650 | 300.5 | 0 | 1390 |

FIG. 12

| | |
|---|---|
| Temperature | 250°F |
| Differential pressure | 300 psi |
| Thickness of filter cake | 0.031 in |
| Weight of filter cake | 6.9 g |
| Brine (KCl) | 18 wt% |

|          | Removal Efficiency |
|----------|--------------------|
| 0 hours  | --                 |
| 4 hours  | 91%                |
| 8 hours  | 95%                |
| 20 hours | 97%                |

Removal Efficiency:   91%   95%   97%

FIG. 14

|  | pH | $Ca^{2+}$ (mg/L) | $Mg^{2+}$ (mg/L) | $Na^+$ (mg/L) | $K^+$ (mg/L) | $Al^{3+}$ (mg/L) | $Fe^{2+/3+}$ (mg/L) |
|---|---|---|---|---|---|---|---|
| 0 hours | 1.01 | 0 | 0 | 100422 | 132 | 0 | 0 |
| 4 hours | 0.44 | 334 | 0 | 102950 | 182 | 0 | 0 |
| 8 hours | 0.64 | 576 | 0 | 103700 | 245 | 0 | 1471 |
| 20 hours | 0.67 | 601 | 0 | 108200 | 254 | 0 | 1585 |

FIG. 15

| KCl Brine | Temp. | Removal Efficiency (4 hours) | Removal Efficiency (8 hours) | Removal Efficiency (20 hours) | Final Solution pH |
|---|---|---|---|---|---|
| 5% | 140 °F | 84% | 87% | 94% | n/a |
| 5% | 190 °F | 95% | 97% | 98% | n/a |
| 18% | 190 °F | 90% | 97% | 98% | 1.02 |
| 18% | 250 °F | 91% | 95% | 97% | 0.97 |

COMPOSITIONS AND METHODS FOR FILTER CAKE REMOVAL

RELATED APPLICATIONS

This application claims the benefit of U.S. Provisional Application Ser. No. 62/175,817, filed on Jun. 15, 2015, and U.S. Provisional Application Ser. No. 62/232,984, filed on Sep. 25, 2015, both of which are incorporated herein by reference in their entirety.

BACKGROUND OF THE DISCLOSURE

1. Field of the Disclosure

The present disclosure relates to a composition for removing filter cake from a subterranean borehole and a method for filter cake removal. More particularly, the present disclosure relates to a composition for filter cake removal containing an encapsulated peroxygen (e.g., acrylic resin coated ammonium persulfate), a surfactant (e.g., nonionic surfactant), and optionally an unencapsulated peroxygen. The method (e.g., a one-step process) involves contacting the filter cake with the composition, and allowing the composition to remain in contact with the filter cake for a period of time sufficient to degrade the filter cake. The composition reaction with the filter cake results in acidic conditions, thereby eliminating any need for follow up acid treatments.

2. Description of the Related Art

Drilling muds are used in the oil and gas industry during the process of drilling boreholes into the earth. The addition of drilling muds (or drilling fluids) has multiple functions, including providing hydrostatic pressure to prevent formation fluids from entering the wellbore, prevention of formation damage, keeping the drill bit cool, and lifting and suspending drill cuttings to the surface. Drilling muds can either be water-based muds, or oil-based muds. Oil-based drilling fluids are used in formations with clays that react, swell, or slough when exposed to water-based fluids, and are also able to be used at higher temperatures.

As the drilling fluid is forced against permeable mediums within the wellbore, residue is deposited resulting in the formation of filter cake, or mudcake. Upon completion of the drilling, the mudcake must be removed to allow production of the formation fluids. Removal of the filter cake must be as complete as possible in order to recover permeability within the formation.

A common problem with current treatment methods is the lack of control in uniform breakdown of the filter cake which results in worm holes, through which the treatment fluid then enters. As such, current treatment methods may include multiple treatment steps to achieve the desired outcome, including an acid injection treatment to dissolve carbonates, found in the mud, and/or certain polymers.

Several methods of filter cake removal exist which include beginning with a filter cake composition designed to react with a subsequent treatment step. Dobson, Jr. et al., U.S. Pat. No. 5,607,905 teaches a process for enhancing removal of filter cake wherein an alkaline earth metal peroxide as an integral component is deposited within the filter cake. Upon contacting the filter cake with an acid solution treatment, the peroxide becomes activated for a period of time such that the polymer within the filter cake will decompose. Hollenbeck et al. U.S. Pat. No. 4,809,783 teach a method for dissolving polysaccharide-containing filter cake by injecting effective amounts of treatment fluid comprising a soluble source of fluoride ions present in an amount sufficient to provide a molar concentration of from about 0.01 to about 0.5, having a pH in the range of from about 2 to about 4. Hollenbeck also teaches that the said treatment fluid may contain an effective amount of oxidizer capable of degrading the polysaccharide present in the filter cake upon disruption of the metal ion-polysaccharide complex. That oxidizer may be sodium persulfate.

Hossaini et al. U.S. Pat. No. 6,886,635 discloses a method of removing filter cake from a subterranean borehole that involves drilling the borehole with a fluid that includes additives to form a filter cake having an oxidant-degrading component, preferably a polysaccharide. The filter cake is contacted with a brine solution containing persulfate salt to degrade polymers within the filter cake, in well bores having temperatures ranging from about 65° F. to 165° F. The pace of the reaction is dependent on the concentration of persulfate. Hossaini et al. also teach this method further involves a step of flushing away the decomposed filter cake with low concentration of acid. Data tables demonstrate the need for a follow up acid treatment in order to achieve effective results of above 90% recovered production permeability, at all temperatures tested.

Each of these methods includes dependency on a previous or subsequent step in order to achieve the most effective results. A need exists for a single treatment which will provide effective, controlled, uniform filter cake breakdown under a wide temperature range. The single treatment should be capable of achieving over 90% recovered permeability.

SUMMARY OF THE DISCLOSURE

The present disclosure provides a composition for removing filter cake from a subterranean borehole and a method for filter cake removal. More particularly, the disclosure provides a composition for filter cake removal containing an encapsulated peroxygen (e.g., acrylic resin coated ammonium persulfate), a surfactant (e.g., nonionic surfactant), and optionally an unencapsulated peroxygen.

The present disclosure provides a composition for removing filter cake from a subterranean borehole and a method for filter cake removal which is effective at temperatures up to 250° F. or greater. More particularly, the disclosure provides a composition containing an encapsulated peroxygen (e.g., acrylic resin coated ammonium persulfate), a surfactant (e.g., nonionic surfactant), and optionally an unencapsulated peroxygen which effectively removes filter cake at temperatures as high as 250° F. or greater.

The present disclosure provides a one-step method for degrading filter cake. The method involves contacting the filter cake with a composition comprising (a) an encapsulated peroxygen; (b) a surfactant; and optionally (c) an unencapsulated peroxygen; and allowing the composition to remain in contact with the filter cake for a period of time sufficient to degrade the filter cake. The reaction of the composition with the filter cake results in acidic conditions, thereby eliminating any need for follow up acid treatments.

The present disclosure provides compositions and methods of using a single fluid treatment for removing filter cake from a subterranean borehole to increase flow, production, and/or recovery of oil and gas. The compositions include coated peroxygen compounds, surfactant, and optionally uncoated peroxygen compounds, and the treatment method creates acidic conditions.

In accordance with this disclosure, a method is provided for removing filter cake from subterranean boreholes and wellbores in a one-step treatment process at temperatures up to 250° F. or greater. The composition can include a surfactant with an encapsulated peroxygen compound and optionally an unencapsulated peroxygen compound. At least one component can be mixed with fresh water, brine water, formation water, water with potassium chloride or other salts added, or combinations prior to introduction into the subterranean formation. The encapsulation or coating provides a controlled release of peroxygen degradant, allowing more uniform breakdown of filter cake throughout the wellbore. The treatment may also comprise a cosolvent to aid in dissolving oils and further breakdown of oil based filter cakes. The reaction of this composition with the filter cake results in acidic conditions, thereby eliminating any need for follow up acid treatments.

The present disclosure provides method of removing filter cake from a subterranean borehole. The method comprises drilling a borehole with a drill-in fluid to form a filter cake; contacting the filter cake with a composition comprising (a) an encapsulated peroxygen (e.g., acrylic resin coated ammonium persulfate); and (b) a surfactant; and allowing the composition to remain downhole for a period of time sufficient to degrade the filter cake.

The present disclosure also provides a method of removing filter cake from a subterranean borehole. The method comprises drilling a borehole with a drill-in fluid to form a filter cake; contacting the filter cake with a composition comprising (a) an encapsulated peroxygen (e.g., acrylic resin coated ammonium persulfate); (b) a surfactant; and (c) an unencapsulated peroxygen; and allowing the composition to remain downhole for a period of time sufficient to degrade the filter cake.

The present disclosure further provides a method of removing filter cake from a subterranean borehole. The method comprises drilling a borehole with a drill-in fluid to form a filter cake; contacting the filter cake with a composition comprising (a) an unencapsulated peroxygen; and (b) a surfactant; and allowing the composition to remain downhole at a temperature from about 180° F. to about 250° F. and for a period of time sufficient to degrade the filter cake.

The present disclosure yet further provides a composition for removing filter cake from a subterranean borehole. The composition comprises (a) an encapsulated peroxygen (e.g., acrylic resin coated ammonium persulfate); and (b) a surfactant.

The present disclosure also provides a composition for removing filter cake from a subterranean borehole. The composition comprises (a) an encapsulated peroxygen (e.g., acrylic resin coated ammonium persulfate); (b) a surfactant; and (c) an unencapsulated peroxygen.

The present disclosure further provides a composition for removing filter cake from a subterranean borehole in which the filter cake is chemically broken down by the composition via direct oxidation or free radical oxidation. The composition contains an oxidant that may be an encapsulated peroxygen and/or an unencapsulated peroxygen.

The present disclosure preferably provides a one step process for removing filter cake from subterranean boreholes and wellbores. The reaction of any of the compositions of this disclosure with the filter cake results in acidic conditions, thereby eliminating any need for follow up acid treatments.

Through filter cake removal, the compositions and methods of this disclosure provide for increased flow, production, and/or recovery of oil and gas hydrocarbons from a subterranean formation.

These and other systems, methods, objects, features, and advantages of the present disclosure will be apparent to those skilled in the art from the following detailed description of the preferred embodiment and the drawings.

BRIEF DESCRIPTION OF THE DRAWINGS

FIG. 1 is a table showing ingredients and amounts thereof of an optimized oil-based drilling mud prepared in Example 1.

FIG. 2 is a table showing properties of a core sample in Example 1.

FIG. 3 is a table showing conditions used in breaking the filter cake in Example 2.

FIG. 5 is a table showing filtrate analysis for $Na^+$, $K^+$, $Mg^{2+}$, $Ca^{2+}$, $Fe^{2+/3+}$ and $Al^{3+}$ in Example 2.

FIG. 6 is a table showing conditions used in breaking the filter cake in Example 3.

FIG. 8 is a table showing filtrate analysis for $Na^+$, $K^+$, $Mg^{2+}$, $Ca^{2+}$, $Fe^{2+/3+}$ and $Al^{3+}$ in Example 3.

FIG. 9 is a table showing conditions used in breaking the filter cake in Example 4.

FIG. 11 is a table showing filtrate analysis for $Na^+$, $K^+$, $Mg^{2+}$, $Ca^{2+}$, $Fe^{2+/3+}$ and $Al^{3+}$ in Example 4.

FIG. 12 is a table showing conditions used in breaking the filter cake in Example 5.

FIG. 14 is a table showing filtrate analysis for $Na^+$, $K^+$, $Mg^{2+}$, $Ca^{2+}$, $Fe^{2+/3+}$ and $Al^{3+}$ in Example 5.

FIG. 15 is a table showing filter cake removal efficiencies and final pH results in Example 6.

DESCRIPTION OF THE EMBODIMENTS

Figure 4:
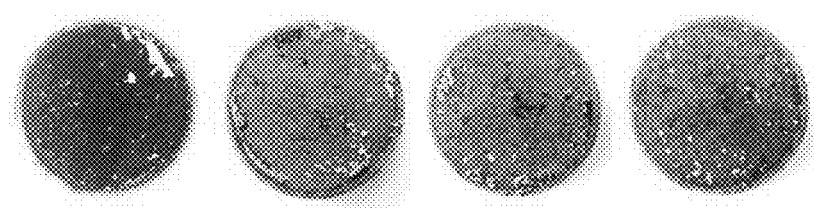
FIG. 4 is a table and photographs showing filter cake removal results in Example 2.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these exemplary embodiments are provided so that the present disclosure satisfies applicable legal requirements. Also, like numbers refer to like elements throughout.

In an embodiment, the present disclosure provides a composition for removing filter cake from a subterranean borehole and a method for filter cake removal. The filter cake removal allows for increasing flow, production, and/or recovery of oil and gas hydrocarbons from a wellbore or a portion of a subterranean formation. The composition can include an encapsulated peroxygen, a surfactant, and unencapsulated peroxygen, an alkali metal chelate, and a cosolvent. For example, the encapsulated peroxygen can be an encapsulated peroxide, an encapsulated source of peroxide, encapsulated sodium persulfate, encapsulated potassium persulfate, encapsulated ammonium persulfate, and combinations thereof. For example, the surfactants can be nonionic plant based surfactants such as fatty alcohol ethoxylates, fatty acid ethoxylates, fatty acid esters, fatty acid methyl ester ethoxylates, alkyl polyglucosides, polyalcohol ethoxylates, soy alkyltrimethyl ammonium chlorides, or combinations. For example, the unencapsulated peroxygen can be an unencapsulated hydrogen peroxide, an unencapsulated source of hydrogen peroxide, unencapsulated sodium persulfate, unencapsulated potassium persulfate, unencapsulated ammonium persulfate, and combinations thereof. Examples of solvents include, for example, terpenoid- or methyl soyate-ethyl lactate-, methyl lactate- or ethyl acetate-based compounds or combinations. Examples of alkali metal chelates are sodium or potassium chelates. The alkali metal chelate can serve the purpose of scavenging ionic or bound phases of metals in a formation, such as iron, thereby extending the life of the peroxygen and making the peroxygen more stable in the well bore or subterranean formation and increasing the peroxygen penetration in the formation. The surfactants and cosolvents can provide further stabilization of the peroxygens in the well bore and subterranean formation. The stability of this composition also allows for treatment in formations with temperatures up to 250° F. or greater.

In another embodiment, the composition of this disclosure includes a fluid for removing filter cake from a subterranean borehole thereby increasing flow, production, and/or recovery of hydrocarbons from a wellbore or a portion of a subterranean formation. The composition includes an encapsulated peroxygen, a surfactant, and optionally an unencapsulated peroxygen. The composition also optionally includes an alkali chelate, e.g., a sodium or potassium chelate, and a cosolvent. The fluid is applied to a portion of a wellbore or an adjacent subterranean formation, for example, as a drilling fluid, a well bore treatment, for oil or gas production stimulation, for slick water fracturing, for enhanced oil recovery, and combinations of these.

The encapsulated peroxygen can be, for example, an encapsulated peroxide, an encapsulated source of peroxide, encapsulated sodium persulfate, encapsulated potassium persulfate, encapsulated ammonium persulfate, and combinations thereof. The surfactant can be, for example, a nonionic plant based surfactant such as fatty alcohol ethoxylates, fatty acid ethoxylates, fatty acid esters, fatty acid methyl ester ethoxylates, alkyl polyglucosides, polyalcohol ethoxylates, soy alkyltrimethyl ammonium chlorides, or combinations. The encapsulated peroxygen compound can be present in a final concentration applied to the wellbore or subterranean formation that varies from 0.01 to 20 percent by weight of peroxygen, for example, from 0.01 to 10 percent by weight of peroxygen. The pH of the composition can be adjusted if needed to avoid pH changes in the formation.

In some embodiments, the concentration of the encapsulated peroxygen introduced into the wellbore or subterranean formation is between about 0.01 and about 20 percent by weight. The concentration is determined by dividing the weight of the encapsulated peroxygen by the total weight of the composition when it is introduced into the wellbore or subterranean formation. In some embodiments, the concentration of encapsulated peroxygen is greater than about 0.01, 0.05, or 0.1 percent by weight of peroxygen. In some embodiments, the concentration of encapsulated peroxygen is less than about 15, 12, 10, 8, or 5 percent by weight of peroxygen. In some embodiments the concentration of encapsulated peroxygen relative to the non-water components is greater than about 1, 2, 5, or 10 percent by weight of peroxygen. In some embodiments the concentration of encapsulated peroxygen relative to the non-water components is less than about 35, 30 or 25 percent by weight of peroxygen relative to the non-water components. The concentration relative to the non-water components is determined by dividing the weight of encapsulated peroxygen by the total weight of the non-water components.

The encapsulating material is preferably derived from a polymeric material. Illustrative materials include, for example, acrylic resins, cross-linked hydrophilic polymers, polymethyl methacrylate, polystyrene, polyethylene glycol, polyurethane, and the like.

In accordance with this disclosure, the encapsulated peroxygen compounds can be prepared by reacting a peroxygen compound and a polymeric material in an amount and under reaction conditions sufficient to form the encapsulated peroxygen compounds.

The concentration of peroxygen compound and polymeric material can be any desired amount that is suitable for the particular application. For the purpose of producing encapsulated peroxygen compounds that are suitable for use in removing filter cake, the amount of encapsulant material (e.g., acrylic resin) is loaded based on the weighted mass of peroxygen compound to be treated. The amount of polymeric material can range from about 1% by weight to about 300% by weight or from about 5% by weight to about 75% by weight, or preferably from about 10% by weight to about 50% by weight, based on the total number of moles of peroxygen compound encapsulated, although it can also be outside of these ranges.

In accordance with this disclosure, the peroxygen chemically breaks down the filter cake via a direct oxidation pathway or via a free radical pathway.

The reaction conditions for preparing the encapsulated peroxygen compounds, such as temperature, pressure and contact time, can vary and any suitable combination of such conditions can be employed herein. The reaction temperature can be between about 10° C. to about 100° C., and more preferably between about 20° C. to about 80° C., and most preferably between about 30° C. to about 50° C. Normally, the reaction is conducted under ambient pressure and the contact time can vary from a matter of seconds or minutes to a few hours or greater. The reactants can be added to the reaction mixture or combined in any order. The contact time employed may, for example, range from about 0.1 to about 24 hours, preferably from about 0.5 to 15 hours, and more preferably from about 1 to 5 hours, although the contact time can be outside of these ranges.

The surfactant can be, for example, a nonionic surfactant selected from a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations. The nonionic surfactant can be an ethoxylated coco fatty acid, an ethoxylated coco fatty ester, an ethoxylated cocoamide, an ethoxylated castor oil, a monococoate, and combinations. The polyethylene glycol (PEG) coco fatty acids can have a range of 5 to 40 PEG groups. The Hydrophile-Lipophile Balance (HLB) range for the PEG coco fatty acid can be 10 to 19. The concentration range of this compound can be from 0.01 to 80 percent of the total surfactant in this composition. The ethoxylated plant oil-based surfactants consisting of a PEG castor oil can have a range of 2.5 to 40 PEG groups. The Hydrophile-Lipophile Balance (HLB) range for the PEG castor oil can be 2.1 to 16. The concentration range of this compound can be from 10 to 80 percent of the total surfactant in this composition. The PEG cocamide can have a range of 2 to 20 PEG groups. The Hydrophile-Lipophile Balance (HLB) range for the PEG cocamide can be 2 to 19. The concentration range of this compound can be from 10 to 80 percent of the total surfactant in this composition. The sorbitan ester based surfactants can have the following: sorbitan monooleate with an HLB of 4.8: sorbitan monolaurate with an HLB of 8.6; sorbitan monopalmitate with an HLB of 6.5; and sorbitan monostearate with an HLB of 4.7. The ethoxylated sorbitan ester based surfactants can have the following: polyoxyethylene (20) sorbitan monooleate with an HLB of 15; polyoxyethylene(20) sorbitan monopalmitate with an HLB of 15.6; polyoxyethylene(20) sorbitan monostearate with an HLB of 14.9; and polyoxyethylene(20) sorbitan monooleate with an HLB of 15.0. The surfactant can be present in a final concentration as applied to the wellbore or subterranean formation that varies from 0.01 to 50 percent, for example, from 0.05 to 5 percent by weight.

In an embodiment, the surfactant can be, for example, a nonionic surfactant selected from a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof.

In another embodiment, the surfactant can be, for example, a nonionic surfactant selected from an ethoxylated coco fatty acid, an ethoxylated coco fatty ester, an ethoxylated cocoamide, an ethoxylated castor oil, a monococoate, and combinations thereof.

In a further embodiment, the surfactant can be, for example, the ethoxylated coco fatty acid can be a polyethylene glycol (PEG) coco fatty acid having a range of about 5 to about 40 PEG groups, and a Hydrophile-Lipophile Balance (HLB) range from about 10 to about 19; the ethoxylated castor oil can be a polyethylene glycol (PEG) castor oil having a range of about 2.5 to about 40 PEG groups, and a Hydrophile-Lipophile Balance (HLB) range from about 2.1 to about 16; the ethoxylated cocoamide can be a polyethylene glycol (PEG) cocamide having a range of about 2 to about 20 PEG groups, and a Hydrophile-Lipophile Balance (HLB) range from about 2 to about 19.

In a yet further embodiment, the surfactant can be, for example, the surfactant can be a sorbitan ester selected from sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7.

In another embodiment, the surfactant can be, for example, the surfactant can be an ethoxylated sorbitan ester selected from a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

In some embodiments, the surfactant concentration in the composition when introduced into the wellbore or subterranean formation may be between about 0.01 and about 50 percent by weight. The concentration is measured by dividing the weight of the total surfactant by the total weight of the composition. The concentration may be greater than about 0.01, 0.03, 0.05, 0.1, 0.5, or 1 by weight or less than about 50, 45, 40, 35, 30, 25, 20, 15, 10, or 5 percent by weight. Relative to the non-water components, the surfactant concentration may be greater than about 5, 10, 15, 20, 25, or 30 percent or less than about 95%, 90%, 85%, 80%. The concentration relative to the non-water components is determined by dividing the weight of surfactant by the total weight of the non-water components in the composition.

The composition of this disclosure may optionally include an unencapsulated peroxygen such as, for example, an unencapsulated peroxide, an unencapsulated source of peroxide, unencapsulated sodium persulfate, unencapsulated potassium persulfate, unencapsulated ammonium persulfate, and combinations thereof. The unencapsulated peroxygen compound can be present in a final concentration applied to the wellbore or subterranean formation that varies from 0.01 to 20 percent, for example, from 0.01 to 10 percent by weight.

In some embodiments, the concentration of the unencapsulated peroxygen introduced into the wellbore or subterranean formation is between about 0.01 and about 20 percent by weight. The concentration is determined by dividing the weight of the unencapsulated peroxygen by the total weight of the composition when it is introduced into the wellbore or subterranean formation. In some embodiments, the concentration of unencapsulated peroxygen is greater than about 0.01, 0.05, or 0.1 percent by weight. In some embodiments, the concentration of unencapsulated peroxygen is less than about 15, 12, 10, 8, or 5 percent by weight. In some embodiments the concentration of unencapsulated peroxygen relative to the non-water components is greater than about 1, 2, 5, or 10 percent by weight. In some embodiments the concentration of unencapsulated peroxygen relative to the non-water components is less than about 35, 30 or 25 percent by weight relative to the non-water components. The concentration relative to the non-water components is determined by dividing the weight of unencapsulated peroxygen by the total weight of the non-water components.

The composition of this disclosure may optionally include a chelate, such as a mono-, di-, tri-, or tetra-sodium ethylenediaminetetraacetic acid (EDTA), a mono-, di-, tri-, or tetra-potassium ethylenediaminetetraacetic acid (EDTA) or sodium ethylenediamine-N,N-disuccinic acid (EDDS), or combinations. The selected chelate can be present in a final concentration as applied to the wellbore or subterranean formation that varies from 0.0001 to 5.0 percent by weight. For example, the chelate can be sodium EDTA.

In some embodiments, the chelate concentration in the composition when introduced into the wellbore or subterranean formation may be between about 0.00001 to 5.0 percent by weight. The concentration is determined by dividing the weight of the chelate by the total weight of the composition. The concentration may be greater than about 0.0001, 0.00002, 0.0001, 0.001, 0.002, 0.01, or 0.1 percent. The concentration may be less than about 5.0, 4.0, 3.0, 2.0, 1.0, or 0.5 percent. The chelate concentration, relative to the non-water components may be between about 0.2 and about 5 percent by weight. The concentration relative to the non-water components is determined by dividing the weight of the chelate by the total weight of the non-water components of the composition. The concentration, relative to the non-water components, may be greater than about 0.2, 0.5, 0.7, or 1.0 percent, or less than about 5, 4.5, 4, 3.5, 3, 2.5, or 2 percent by weight.

The composition of this disclosure may optionally include a cosolvent, such as a terpene, for example, hemiterpene, a monoterpene, a sesquiterpene, a diterpene, a sesterterpene, a triterpene, a tetraterpene, and combinations. For example, the terpene can be a monoterpene, such as geraniol; d-limonene, or terpineol, or combinations. For example, the terpene can be a citrus derived terpene, or a terpene derived from conifers. The selected terpene concentration in the composition can be present in a final concentration as applied to the wellbore or subterranean formation that varies from 0.001% to 50% by weight, for example, from 0.01% to 10% by weight. A soy derived cosolvent, such as methyl soyate, can be a cosolvent in the composition. The methyl soyate concentration can be present in a final concentration as applied to the wellbore or subterranean formation that varies from 0.001% to 50% by weight, for example, from 0.01% to 10% by weight. Ethyl lactate, methyl lactate or ethyl acetate may also be used as cosolvents.

In some embodiments, the cosolvent concentration in the composition when introduced into the wellbore or subterranean formation may be between about 0.001 and about 50 percent. The concentration is determined by dividing the weight of cosolvent by the total weight of the composition introduced into the wellbore or subterranean formation. In some embodiments, the concentration of cosolvent is greater than about 0.001, 0.002, 0.005, 0.007, or 0.01 percent. In some embodiments, the cosolvent concentration is less than about 50, 30, 25, 20, 15, 10, 8, or 5 percent. The cosolvent concentration, relative to the non-water components may be between about 1 and about 40 percent by weight. The concentration, relative to the non-water components, is determined by dividing the weight of cosolvent by the total weight of the non-water components in the composition. The concentration, relative to the non-water components may be greater than about 1, 5, 7, 10, 12, or 15 by weight. The concentration, relative to the non-water components may be less than about 80, 75, 70, 65, 60, 55, 50, 45, or 40 percent by weight.

In some embodiments, the composition further comprises an antioxidant. The antioxidant may be, for example, a plant-derived polyphenol. The plant-derived polyphenol may be, for example, derived from sorghum bran. An antioxidant can be included in the composition to stabilize and control the rate of peroxygen decay.

In the method of this disclosure, filter cake formed on the walls of a subterranean borehole is removed by contacting the filter cake with a composition containing an encapsulated peroxygen, a surfactant, and optionally an unencapsulated peroxygen. Filter cakes are coatings that reduce the permeability of formation walls. Formed during the drilling stage to limit losses from the well bore and protect the formation from possible damage by fluids and solids within the well bore, filter cake layers must be removed from the hydrocarbon-bearing formation so that the formation wall is restored to its natural permeability to allow for hydrocarbon production or cementing.

Filter cakes are typically formed with polymers that encapsulate particles or solids which form a bridge over the formation pores. Drill-in fluids, including any bridging agents and polymers contained within the drilling fluid are well known in the art. In one preferred method of this disclosure, removing filter cake from a subterranean borehole involves drilling the borehole with a drill-in fluid comprising a polymer to form a filter cake. Preferably, the borehole is drilled while circulating a mud therein which comprises a polymer. The polymer is selected from a water soluble organic polymer, a water dispersible organic polymer, a water soluble bio-polymer, a water dispersible bio-polymer and combinations thereof. For example, the polymer selected can be a cationic starch, an anionic starch or a nonionic starch. Optionally, the drill-in fluid comprises finely divided solids dispersed therein to form a filter cake on surfaces of the borehole. Other additives can be used for stabilizing and viscosifying.

When the bore hole is ready for production, the filter cake must be removed to allow for permeability of the formation walls. To remove the filter cake, the filter cake is contacted with a mixture containing an encapsulated peroxygen, a surfactant, and optionally an unencapsulated peroxygen in a variable density brine. In one aspect, the mixture can further include a chelating agent. Preferably, the coated peroxygen is coated ammonium persulfate. Alternatively, the peroxygen is selected from an alkali metal peroxygen, an alkaline earth metal peroxygen and combinations thereof. The alkali metal peroxygen can be selected from potassium persulfate, sodium persulfate, lithium persulfate and combinations thereof, and the alkaline earth metal peroxygen can be selected from calcium persulfate, magnesium persulfate, and combinations thereof. In one aspect, the effective concentration of peroxygen ranges from about 1 lb/bbl to about 50 lbs/bbl, preferably from about 4 lb/bbl to about 48 lbs/bbl.

Filter cake break or removal time can be controlled by the concentration of the coated peroxygen within the brine and also varies with downhole temperature. Increasing the concentration or at higher downhole temperatures results in increased filter cake break or removal.

The variable density brine can be selected from $NH_4Cl$, $NaCl$, $KCl$, $CaCl_2$, $ZnCl_2$, and combinations thereof and, with these chloride brines, can have a density varying within a range of from about 8.3 lbs/gal. to about 12.8 lbs/gal, preferably within a range of from about 8.5 lbs/gal. to about 10.4 lbs/gal.

Downhole temperatures differ according to the depth and location of the formation. The filter cake removal composition of this disclosure can be used at a wide range of downhole temperatures. In one preferred method, the mixture is allowed to remain at the downhole temperatures ranging from 65° F. to 165° F., or from 165° F. to 180° F., or from 180° F. to 250° F., or greater than 250° F., for a period of time effective to degrade the filter cake, ranging from about 3.5 to about 48 hours or more, depending on the state of well operations at the time. More preferably, the temperature ranges from about 70° F. to 165° F. and the period of time the mixture remains in contact with the filter cake is at least 4 hours. In another preferred method, the mixture is allowed to remain at the downhole temperatures ranging from 165° F. to 250° F. and the period of time the mixture remains in contact with the filter cake is at least 4 hours.

The decomposed filter cake can then be flushed away with the acidic filtrate formed by the method of this disclosure. An organic or inorganic acid is commonly known in the art to increase permeability. The reaction of the composition of this disclosure with the filter cake results in acidic conditions, thereby eliminating any need for follow up acid treatments required by conventional processes. The filtrate will be acidic, for example, with a pH from about 0.1 to about 4, preferably from about 0.1 to about 2.5, and more preferably from about 0.1 to about 1, depending on the period of time that the mixture remains in contact with the filter cake.

In an alternative embodiment of this disclosure, the method of removing filter cake from a subterranean borehole involves contacting the filter cake with a mixture of an encapsulated peroxygen, a surfactant, and optionally an unencapsulated peroxygen in a variable density bromide or chloride brine. The brine can be selected from $NH_4Cl$, $NH_4Br$, NaCl, NaBr, KCl, KBr, $CaCl_2$, $CaBr_2$, $ZnCl_2$, $ZnBr_2$, and combinations thereof. In this preferred method, the mixture is allowed to remain at the downhole temperatures for a period of time effective to degrade the filter cake. The peroxygen is selected from ammonium persulfate, an alkali metal persulfate, an alkaline earth metal persulfate and combinations thereof. The density can vary within a range of from about 8.3 lbs/gal. to as high as about 18 lbs/gal. if a bromide brine is used.

A preferred composition for a filter cake removal fluid can comprise a solution of an encapsulated peroxygen, a surfactant, and optionally an unencapsulated peroxygen in a brine, the concentration of coated peroxygen effective for filter cake break or removal at temperatures between 65° F. to 180° F., preferably, between 65° F. to 165° F., or between 165° F. to 180° F., or between 180° F. and 250° F., or greater than 250° F. Preferably concentration of coated peroxygen ranges from about 1 lb/bbl to about 50 lbs/bbl, preferably from about 4 lbs/bbl to about 48 lbs/bbl, and more preferably, the concentration ranges from 16 lbs/bbl to 48 lbs/bbl. The solution of an encapsulated peroxygen, a surfactant, and optionally an unencapsulated peroxygen in a brine can have a density within a range of about 8.3 lbs/gal to about 12.8 lbs/gal. The coated peroxygen is preferably selected from coated ammonium persulfate, a coated alkali metal persulfate, a coated alkaline earth metal persulfate, and combinations thereof.

Illustrative steps for implementing the method of this disclosure include, for example, installing gravel pack screens and tool assemblies into the borehole. Thereafter introducing sand in a non-viscosified carrier into the borehole; and introducing a filter cake removal fluid of this disclosure in the well bore, in contact with a subterranean formation containing the hydrocarbons to be produced, for a duration effective to substantially remove the filter cake in the vicinity of the subterranean formation. The filter cake removal fluid preferably comprises a solution of an encapsulated peroxygen, a surfactant, and optionally an unencapsulated peroxygen in a brine having a density within a range of about 8.3 lbs/gal to about 12.8 lbs/gal, and the mixture of coated peroxygen, surfactant, and optionally uncoated peroxygen is effective for filter cake break or removal at temperatures between 65° F. to 165° F., or between 180° F. and 250° F., or greater than 250° F.

Fluid loss pills can be used to form the filter cake. In an alternative method of removing filter cake from an existing subterranean borehole in which a fluid loss pill is used, the method comprises placing a fluid loss pill into the borehole, the fluid loss pill having a polymer to form a filter cake. In this method the polymer is selected from a water soluble organic polymer, a water dispersible organic polymer, a water soluble bio-polymer, a water dispersible bio-polymer and combinations thereof. The filter cake is contacted with a mixture of an encapsulated peroxygen, a surfactant, and optionally an unencapsulated peroxygen in a variable density brine. The peroxygen is preferably selected from ammonium persulfate, alkali metal persulfate, alkaline earth metal persulfate and combinations thereof, and the brine can be selected form $NH_4Cl$, NaCl, KCl, $CaCl_2$, $ZnCl_2$, and combinations thereof. In this method the mixture is allowed to remain at the downhole temperatures ranging from 65° F. to 165° F., or from 180° F. to 250° F., or greater than 250° F., for a period of time effective to degrade the polymer filter cake. Alternatively the brine is selected from $NH_4Cl$, $NH_4Br$, NaCl, NaBr, KCl, KBr, $CaCl_2$, $CaBr_2$, $ZnCl_2$, $ZnBr_2$ and combinations thereof and allowing the mixture to remain at the downhole temperatures ranging from 65° F. to 165° F., or from 180° F. to 250° F., or greater than 250° F., for a period of time effective to degrade the polymer filter cake.

High permeability, soft sandstone formations, often found in horizontal drilling, generally require some form of barrier for hole stability. Gravel packing is used to improve hole stability in these conditions. During the practice of this disclosure one method of removing filter cake from a subterranean borehole, comprises drilling the borehole while circulating a mud therein which comprises a polymer, the polymer is selected from a water soluble organic polymer, a water dispersible organic polymer, a water soluble bio-polymer, a water dispersible bio-polymer and combinations thereof.

Following the drilling of a well, when fluid losses are acceptable for the proposed pumping pressures, gravel or sand packing can begin. First the drill-in fluid is displaced with a first clear fluid, which is otherwise similar to the drilling fluid. The well bore is maintained in a slightly overbalanced state. Gravel pack screens and tool assemblies are run into the bore. During this stage, it is desirable to maintain the filter cake with as little fluid loss to the production formation as possible. Following displacement of the drilling fluid, the well is gravel packed. In a preferred procedure, the gravel, preferably sized sand, about 20-30 U.S. mesh, is placed into a nonviscosified carrier, such as a brine. Advantageously, the method of this disclosure comprises the simultaneous application of coated peroxygen, surfactant, and optionally uncoated peroxygen with the gravel pack. Alternatively, at the same time, or at a later time, coated peroxygen, surfactant, and optionally uncoated peroxygen can be added to the gravel pack. Alternatively, coated peroxygen, surfactant, and optionally uncoated peroxygen can be added independently of the gravel pack and also used in systems that do not employ gravel packing.

As the low viscosity fluid cannot transport a significant amount of solids, the sand concentrations are usually from about 60 g/l to 360 g/l and pump rates approach 1 $m^3$/min. The hydrostatic overbalance that arises from the pumping pressure necessary to achieve these rates is desirable since the overbalance holds the filter cake in place. A filter cake removal fluid is then introduced in the wellbore, in contact with a subterranean formation containing the hydrocarbons to be produced, for a duration effective to substantially remove the filter cake in the vicinity of the subterranean formation. Preferably, the filter cake removal fluid comprises a solution of an encapsulated peroxygen, a surfactant, and optionally an unencapsulated peroxygen in a brine having a density within a range of about 8.3 lbs/gal to about 12.8 lbs/gal and effective for degradation at temperatures between 65° F. to 165° F., or between 180° F. to 250° F., or greater than 250° F. The non-viscosified carrier for the sand can comprise the filter cake removal fluid.

In the practice of this disclosure, other additives, such as clay treating additives, pH control agents, lubricants, non-emulsifying agents, iron control agents and the like can be included within the filter cake removal fluid or gravel pack fluid as desired.

In an embodiment, the method of the present invention includes applying a liquid treatment fluid to a portion of a wellbore or a portion of a subterranean formation with a composition including an encapsulated peroxygen (e.g., acrylic resin coated ammonium persulfate), a surfactant, optionally an unencapsulated peroxygen, optionally an alkali chelate (e.g., a sodium or potassium chelate), and optionally a cosolvent. The method can include the following: forming or providing the composition; and introducing the composition through a wellbore to apply it to a portion of a wellbore or a portion of a subterranean formation. The liquid treatment fluid can be applied to a portion of a wellbore or subterranean formation by pumping, displacing, or otherwise locating the fluid to a desired location within the wellbore or subterranean formation for treatment, at a rate and pressure that is less than, equal to, or greater than the reservoir hydraulic fracture pressure. The liquid treatment fluid can be applied to a portion of wellbore or subterranean formation as a drilling fluid, as a chemical treatment, in an oil, gas, or water flow stimulation method, for hydraulic fracturing, in an enhanced oil recovery technique, and combinations. The liquid treatment fluid can be applied to a subterranean formation or a hydrocarbon-bearing subterranean formation that is geologically characterized as unconsolidated or consolidated and where the geologic material is, for example, sand, rock, clay, shale, carbonate, dolomite, coal, an argillaceous mineral, a mineral, or a hydrocarbon-containing geologic material, and combinations. For example, the temperature of the geological formation that can be treated using the disclosed composition and methods of this invention can range from 50° F. to 250° F., or greater than 250° F.

As part of the methods for application, the composition of this disclosure can be allowed to contact the wellbore or a portion of a well bore or subterranean formation or hydrocarbon-bearing subterranean formation for a sufficient period of time to degrade filter cake, and increase flow, production, and/or recovery of hydrocarbons. The composition can be allowed to contact a portion of the well bore, the subterranean formation, a lenticular lens or other types of lens within a formation, the formation cap, the formation base, or a formation interface for a sufficient time, so that the permeability, relative permeability, and/or absolute permeability are increased, causing an increase in the flow, production, and/or recovery of hydrocarbons from the well bore. Adequate time can be allowed for contact of the disclosed composition. Such a sufficient or adequate time can be, for example, from about 1 minute, 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, or 6 months to about 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, 6 months, or 12 months.

Sufficient time can be allowed for the composition to degrade the filter cake. The treatment can cause such targeted areas of a subterranean formation to have an increased permeability, relative permeability, and/or absolute permeability. The composition can be applied with sufficient time allowed for the composition to degrade the filter cake with sufficient action to physically alter, fragment, fracture, crack, pit, and/or create fluid preferential pathways within a portion of the treated subterranean formation, wherein the permeability, relative permeability, and/or absolute permeability is increased. The composition can be applied with sufficient time allowed for the composition to degrade the filter cake with sufficient action to mobilize, release, migrate, realign, and/or redistribute portions of the treated subterranean formation, clays, fines (inorganic and/or organic), sand, precipitates, minerals, and/or individual grains of the treated subterranean formation. These mobilized, released, or otherwise moved components can be removed from the formation and carried into the wellbore along with produced fluids.

Preferred embodiments of this disclosure are described in clauses 1-73 below.

1. A method of removing filter cake from a subterranean borehole, the method comprising: drilling a borehole with a drill-in fluid to form a filter cake; contacting the filter cake with a composition comprising (a) an encapsulated peroxygen; and (b) a surfactant; and allowing the composition to remain downhole for a period of time sufficient to degrade the filter cake.

2. The method of clause 1, wherein the peroxygen chemically breaks down the filter cake via a direct oxidation pathway or via a free radical pathway.

3. The method of clause 1, further comprising removing the degraded filter cake from the subterranean borehole.

4. The method of clause 1, wherein the treatment generates acidic conditions.

5. The method of clause 1, wherein the composition further comprises a variable density brine.

6. The method of clause 1, wherein at least one component of the composition is mixed with fresh water, brine water, formation water with potassium chloride or other salts added, or combinations thereof, prior to introduction into the subterranean borehole.

7. The method of clause 1 wherein the encapsulated peroxygen is selected from the group consisting of encapsulated hydrogen peroxide, an encapsulated source of hydrogen peroxide, encapsulated sodium persulfate, encapsulated potassium persulfate, encapsulated ammonium persulfate, and combinations thereof.

8. The method of clause 1, wherein the encapsulated peroxygen is selected from the group consisting of encapsulated hydrogen peroxide, an encapsulated source of hydrogen peroxide, encapsulated sodium persulfate, encapsulated potassium persulfate, encapsulated ammonium persulfate, and combinations thereof.

9. The method of clause 1, wherein the encapsulated peroxygen is cured acrylic resin encapsulated peroxygen.

10. The method of clause 1, wherein the encapsulated peroxygen is coated ammonium persulfate.

11. The method of clause 1, wherein the encapsulated peroxygen provides a controlled time release of the peroxygen.

12. The method of clause 1, wherein the peroxygen from the encapsulated peroxygen decomposes from a direct reduction reaction, a surface catalyzed reaction, and/or a free radical decomposition reaction.

13. The method of clause 1, wherein the surfactant is nonionic.

14. The method of clause 1, wherein the surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

15. The method of clause 1, wherein the surfactant comprises a nonionic surfactant selected from the group consisting of a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof.

16. The method of clause 1, wherein the surfactant comprises a nonionic surfactant selected from the group consisting of an ethoxylated coco fatty acid, an ethoxylated coco fatty ester, an ethoxylated cocoamide, an ethoxylated castor oil, a monococoate, and combinations thereof.

17. The method of clause 16, wherein the ethoxylated coco fatty acid is a polyethylene glycol (PEG) coco fatty acid having a range of about 5 to about 40 PEG groups, and a Hydrophile-Lipophile Balance (HLB) range from about 10 to about 19; the ethoxylated castor oil is a polyethylene glycol (PEG) castor oil having a range of about 2.5 to about 40 PEG groups, and a Hydrophile-Lipophile Balance (HLB) range from about 2.1 to about 16; the ethoxylated cocoamide is a polyethylene glycol (PEG) cocamide having a range of about 2 to about 20 PEG groups, and a Hydrophile-Lipophile Balance (HLB) range from about 2 to about 19.

18. The method of clause 1, wherein the surfactant comprises a sorbitan ester selected from the group consisting of sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7.

19. The method of clause 1, wherein the surfactant comprises an ethoxylated sorbitan ester selected from the group consisting of a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

20. The method of clause 1, wherein the surfactant is present in the composition, when the composition is introduced into the wellbore or subterranean formation, in an amount from about 0.01 to about 50 percent by weight, based on the total weight of the composition.

21. The method of clause 1, further comprising a chelate, wherein the chelate is selected from the group consisting of a mono-, di-, tri- or tetra-sodium ethylenediaminetetraacetic acid (EDTA), a mono-, di-, tri- or tetra-potassium ethylenediaminetetraacetic acid (EDTA), sodium ethylenediamine-N,N'-disuccinic acid (EDDS), and combinations thereof.

22. The method of clause 1, further comprising a cosolvent, wherein the cosolvent is selected from the group consisting of a terpene, methyl soyate, ethyl lactate, methyl lactate, ethyl acetate, and combinations thereof.

23. The method of clause 1, wherein the encapsulated peroxygen and surfactant are added simultaneously or sequentially to the composition.

24. The method of clause 1, wherein the composition is applied to the subterranean borehole as, or in combination with, a drilling fluid, treatment fluid, stimulation fluid, fracturing fluid, a fluid used in an enhanced oil recovery technique, or a combination thereof.

25. The method of clause 1, further comprising: allowing the components to contact blockage or damage in the subterranean borehole, so that the damage or blockage is altered, removed, degraded, and/or dissolved, so that a permeability, a relative permeability, and/or an absolute permeability of the subterranean formation is increased, causing an increase in the production rates and/or recovery of hydrocarbons.

26. A method of removing filter cake from a subterranean borehole, the method comprising: drilling a borehole with a drill-in fluid to form a filter cake; contacting the filter cake with a composition comprising (a) an encapsulated peroxygen; (b) a surfactant; and (c) an unencapsulated peroxygen; and allowing the composition to remain downhole for a period of time sufficient to degrade the filter cake.

27. The method of clause 26, wherein the peroxygen chemically breaks down the filter cake via a direct oxidation pathway or via a free radical pathway.

28. The method of clause 26, further comprising removing the degraded filter cake from the subterranean borehole.

29. The method of clause 26, wherein the treatment generates acidic conditions.

30. The method of clause 26, wherein the composition further comprises a variable density brine.

31. The method of clause 26, wherein at least one component of the composition is mixed with fresh water, brine water, formation water with potassium chloride or other salts added, or combinations thereof, prior to introduction into the subterranean borehole.

32. The method of clause 26, wherein the encapsulated peroxygen is selected from the group consisting of encapsulated hydrogen peroxide, an encapsulated source of hydrogen peroxide, encapsulated sodium persulfate, encapsulated potassium persulfate, encapsulated ammonium persulfate, and combinations thereof.

33. The method of clause 26, wherein the encapsulated peroxygen is cured acrylic resin encapsulated peroxygen.

34. The method of clause 26, wherein the encapsulated peroxygen is coated ammonium persulfate.

35. The method of clause 26, wherein the encapsulated peroxygen provides a controlled time release of the peroxygen.

36. The method of clause 26, wherein the encapsulated peroxygen is present in an amount of at least 5 weight percent, based on the total weight of the composition.

37. The method of clause 26, wherein peroxygen from the encapsulated peroxygen decomposes from a direct reduction reaction, a surface catalyzed reaction, and/or a free radical decomposition reaction.

38. The method of clause 26, wherein the surfactant is nonionic.

39. The method of clause 26, wherein the surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

40. The method of clause 26, wherein the surfactant comprises a nonionic surfactant selected from the group consisting of a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof.

41. The method of clause 26, wherein the surfactant comprises a nonionic surfactant selected from the group consisting of an ethoxylated coco fatty acid, an ethoxylated coco fatty ester, an ethoxylated cocoamide, an ethoxylated castor oil, a monococoate, and combinations thereof 42. The method of clause 41, wherein the ethoxylated coco fatty acid is a polyethylene glycol (PEG) coco fatty acid having a range of about 5 to about 40 PEG groups, and a Hydrophile-Lipophile Balance (HLB) range from about 10 to about 19; the ethoxylated castor oil is a polyethylene glycol (PEG) castor oil having a range of about 2.5 to about 40 PEG groups, and a Hydrophile-Lipophile Balance (HLB) range from about 2.1 to about 16; the ethoxylated cocoamide is a polyethylene glycol (PEG) cocamide having a range of about 2 to about 20 PEG groups, and a Hydrophile-Lipophile Balance (HLB) range from about 2 to about 19.

43. The method of clause 26, wherein the surfactant comprises a sorbitan ester selected from the group consisting of sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7.

44. The method of clause 26, wherein the surfactant comprises an ethoxylated sorbitan ester selected from the group consisting of a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

45. The method of clause 26, wherein the surfactant is present in the composition, when the composition is introduced into the wellbore or subterranean formation, in an amount from about 0.01 to about 50 percent by weight, based on the total weight of the composition.

46. The method of clause 26, wherein the unencapsulated peroxygen is selected from the group consisting of unencapsulated hydrogen peroxide, an unencapsulated source of hydrogen peroxide, unencapsulated sodium persulfate, unencapsulated potassium persulfate, unencapsulated ammonium persulfate, and combinations thereof.

47. The method of clause 26, further comprising a chelate, wherein the chelate is selected from the group consisting of a mono-, di-, tri- or tetra-sodium ethylenediaminetetraacetic acid (EDTA), a mono-, di-, tri- or tetra-potassium ethylenediaminetetraacetic acid (EDTA), sodium ethylenediamine-N,N'-disuccinic acid (EDDS), and combinations thereof.

48. The method of clause 26, further comprising a cosolvent, wherein the cosolvent is selected from the group consisting of a terpene, methyl soyate, ethyl lactate, methyl lactate, ethyl acetate, and combinations thereof.

49. The method of clause 26, wherein the composition is applied to the subterranean borehole as, or in combination with, a drilling fluid, treatment fluid, stimulation fluid, fracturing fluid, a fluid used in an enhanced oil recovery technique, or a combination thereof.

50. The method of clause 26, further comprising: allowing the components to contact blockage or damage in the subterranean borehole, so that the damage or blockage is altered, removed, degraded, and/or dissolved, so that a permeability, a relative permeability, and/or an absolute permeability of the subterranean formation is increased, causing an increase in the production rates and/or recovery of hydrocarbons.

51. A method of removing filter cake from a subterranean borehole, the method comprising: drilling a borehole with a drill-in fluid to form a filter cake; contacting the filter cake with a composition comprising (a) an unencapsulated peroxygen; and (b) a surfactant; and allowing the composition to remain downhole at a temperature from about 180° F. to about 250° F. and for a period of time sufficient to degrade the filter cake.

52. The method of clause 51, wherein the peroxygen chemically breaks down the filter cake via a direct oxidation pathway or via a free radical pathway.

53. The method of clause 51, further comprising removing the degraded filter cake from the subterranean borehole.

54. The method of clause 51, wherein the treatment generates acidic conditions.

55. The method of clause 51, wherein the composition further comprises a variable density brine.

56. The method of clause 51, wherein at least one component of the composition is mixed with fresh water, brine water, formation water with potassium chloride or other salts added, or combinations thereof, prior to introduction into the subterranean borehole.

57. The method of clause 51, wherein the unencapsulated peroxygen is selected from the group consisting of unencapsulated hydrogen peroxide, an unencapsulated source of hydrogen peroxide, unencapsulated sodium persulfate, unencapsulated potassium persulfate, unencapsulated ammonium persulfate, and combinations thereof.

58. The method of clause 51, wherein peroxygen from the unencapsulated peroxygen decomposes from a direct reduction reaction, a surface catalyzed reaction, and/or a free radical decomposition reaction.

59. The method of clause 51, wherein the surfactant is nonionic.

60. The method of clause 51, wherein the surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

61. The method of clause 51, wherein the surfactant comprises a nonionic surfactant selected from the group consisting of a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof.

62. The method of clause 51, wherein the surfactant comprises a nonionic surfactant selected from the group consisting of an ethoxylated coco fatty acid, an ethoxylated coco fatty ester, an ethoxylated cocoamide, an ethoxylated castor oil, a monococoate, and combinations thereof.

63. The method of clause 62, wherein the ethoxylated coco fatty acid is a polyethylene glycol (PEG) coco fatty acid having a range of about 5 to about 40 PEG groups, and a Hydrophile-Lipophile Balance (HLB) range from about 10 to about 19; the ethoxylated castor oil is a polyethylene glycol (PEG) castor oil having a range of about 2.5 to about 40 PEG groups, and a Hydrophile-Lipophile Balance (HLB) range from about 2.1 to about 16; the ethoxylated cocoamide is a polyethylene glycol (PEG) cocamide having a range of about 2 to about 20 PEG groups, and a Hydrophile-Lipophile Balance (HLB) range from about 2 to about 19.

64. The method of clause 51, wherein the surfactant comprises a sorbitan ester selected from the group consisting of sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7.

65. The method of clause 51, wherein the surfactant comprises an ethoxylated sorbitan ester selected from the group consisting of a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

66. The method of clause 51, wherein the surfactant is present in the composition, when the composition is introduced into the wellbore or subterranean formation, in an amount from about 0.01 to about 50 percent by weight, based on the total weight of the composition.

67. The method of clause 51, further comprising a chelate, wherein the chelate is selected from the group consisting of a mono-, di-, tri- or tetra-sodium ethylenediaminetetraacetic acid (EDTA), a mono-, di-, tri- or tetra-potassium ethylenediaminetetraacetic acid (EDTA), sodium ethylenediamine-N,N'-disuccinic acid (EDDS), and combinations thereof.

68. The method of clause 51, further comprising a cosolvent, wherein the cosolvent is selected from the group consisting of a terpene, methyl soyate, ethyl lactate, methyl lactate, ethyl acetate, and combinations thereof.

69. The method of clause 51, wherein the composition is applied to the subterranean borehole as, or in combination with, a drilling fluid, treatment fluid, stimulation fluid, fracturing fluid, a fluid used in an enhanced oil recovery technique, or a combination thereof.

70. The method of clause 51, further comprising: allowing the components to contact blockage or damage in the subterranean borehole, so that the damage or blockage is altered, removed, degraded, and/or dissolved, so that a permeability, a relative permeability, and/or an absolute permeability of the subterranean formation is increased, causing an increase in the production rates and/or recovery of hydrocarbons.

71. A composition for removing filter cake from a subterranean borehole, the composition comprising: (a) an encapsulated peroxygen; and (b) a surfactant.

72. A composition for removing filter cake from a subterranean borehole, the composition comprising: (a) an encapsulated peroxygen; (b) a surfactant; and (c) an unencapsulated peroxygen.

73. A one-step method for degrading filter cake, the method comprising: contacting the filter cake with a composition comprising (a) an encapsulated peroxygen; (b) a surfactant; and optionally (c) an unencapsulated peroxygen; and allowing the composition to remain in contact with the filter cake for a period of time sufficient to degrade the filter cake; wherein the method generates acidic conditions.

As used herein, "encapsulated" or "encapsulating" refers to the one or more peroxygen compounds being covered by an encapsulating material of this disclosure. For example, the encapsulating material can form a layer or shell around the peroxygen compound, and/or encapsulate the peroxygen compound.

The terms "comprises" or "comprising" are interpreted as specifying the presence of the stated features, integers, steps or components, but not precluding the presence of one or more other features, integers, steps or components or groups thereof.

It should be understood that various alternatives, combinations and modifications of the present disclosure could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The following examples are provided to offer additional description of the compositions and methods disclosed and claimed in this patent. These are exemplary only, and are not intended to limit the disclosure in any aspect. All proportions and percentages set out herein are by weight unless the contrary is stated.

Example 1

Optimized oil-based drilling mud was prepared. The mud ingredients and amounts thereof are set forth in FIG. 1. A filter cake was formed using a multi-mixer and a high temperature high pressure (HTHP) filtration press. A treatment solution was prepared in a KCl brine solution. The filter cake was soaked over 4 hours, 8 hours, and 20 hours. Filtrate solution was analyzed for ion concentrations. By measuring the filtration rate before and after each test, the permeability ratio ($k_f/k_i$) was determined. The final permeability is designated $k_f$. The initial permeability is designated $k_i$. The properties of a core sample are given in FIG. 2.

Example 2

A blend composition containing a surfactant (i.e., ethoxylated coco fatty acid) and a coated persulfate (i.e., acrylic resin coated ammonium persulfate) was prepared. The blend was used in breaking of a filter cake formed in Example 1 and creation of acidic conditions. The conditions used in breaking of the filter cake are given in FIG. 3. The filter cake removal results are given in FIG. 4. Photographs of the filter cake removal results are also given in FIG. 4. A filtrate analysis for $Na^+$, $K^+$, $Mg^{2+}$, $Ca^{2+}$, $Fe^{2+/3+}$ and $Al^{3+}$ is given in FIG. 5. Filter cake was successfully treated at 140° F. in 5 wt % KCl brine. The permeability ratio ($k_f/k_i$) was determined to be 1.125, indicating improved permeability.

Example 3

Figure 7:
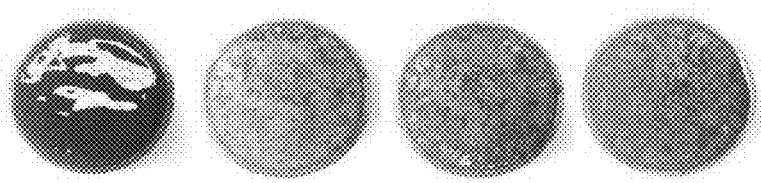
FIG. 7 is a table and photographs showing filter cake removal results in Example 3.

A blend composition containing a surfactant (i.e., ethoxylated coco fatty acid) and a coated persulfate (i.e., acrylic resin coated ammonium persulfate) was prepared. The blend was used in breaking of a filter cake formed in Example 1 and creation of acidic conditions. The conditions used in breaking of the filter cake are given in FIG. 6. The filter cake removal results are given in FIG. 7. Photographs of the filter cake removal results are also given in FIG. 7. A filtrate analysis for $Na^+$, $Ca^+$ and $Fe^{2+/3+}$ is given in FIG. 8. Filter cake was successfully treated at 190° F. within 4 hours, where 95% of the filter cake was removed. The permeability ratio ($k_f/k_i$) was determined to be 2.1, indicating improved permeability.

Example 4

Figure 10:
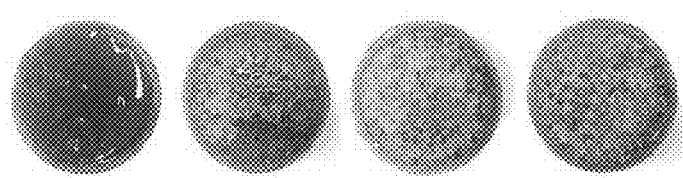
FIG. 10 is a table and photographs showing filter cake removal results in Example 4.

A blend composition containing a surfactant (i.e., ethoxylated coco fatty acid) and a coated persulfate (i.e., acrylic resin coated ammonium persulfate) was prepared. The blend was used in breaking of a filter cake formed in Example 1 and creation of acidic conditions. The conditions used in breaking of the filter cake are given in FIG. 9. The filter cake removal results are given in FIG. 10. Photographs of the filter cake removal results are also given in FIG. 10. A filtrate analysis for $Na^+$, $K^+$, $Mg^{2+}$, $Ca^{2+}$, $Fe^{2+/3+}$ and $Al^{3+}$ is given in FIG. 11. Filter cake was successfully treated at 190° F. within 8 hours, where 97% of the filter cake was removed. The permeability ratio ($k_f/k_i$) was determined to be 2.0, indicating improved permeability. As observed in FIG. 11, the treatment resulted in highly acidic conditions, with a pH of below 1 after 4 hours.

Example 5

Figure 13:
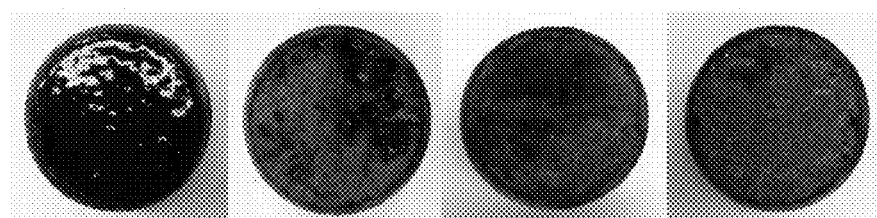
FIG. 13 is a table and photographs showing filter cake removal results in Example 5.

A blend composition containing a surfactant (i.e., ethoxylated coco fatty acid) and a coated persulfate (i.e., acrylic resin coated ammonium persulfate) was prepared. The blend was used in breaking of a filter cake formed in Example 1 and creation of acidic conditions. The conditions used in breaking of the filter cake are given in FIG. 12. The filter cake removal results are given in FIG. 13. Photographs of the filter cake removal results are also given in FIG. 13. A filtrate analysis for $Na^+$, $K^+$, $Mg^{2+}$, $Ca^{2+}$, $Fe^{2+/3+}$ and $Al^{3+}$ is given in FIG. 14. Filter cake was successfully treated at 250° F. within 8 hours, where 91% of the filter cake was removed. The permeability ratio ($k_f/k_i$) was determined to be 1.23, indicating improved permeability. As observed in FIG. 14, the treatment resulted in highly acidic conditions, with a pH of below 1 after 4 hours.

Example 6

Blend compositions containing a surfactant (i.e., ethoxylated coco fatty acid) and a coated persulfate (i.e., acrylic resin coated ammonium persulfate) were prepared. The blend compositions were used in breaking of a filter cake formed in Example 1 and creation of acidic conditions. The conditions used in breaking of the filter cake are given in FIG. 15, including various brine concentrations from 5% to 18% and at various temperatures from 140° F. to 250° F. Filter cake was successfully treated under all tested conditions with removal efficiencies from 84% to 91% after 4 hours and up to 94% to 98% after 20 hours. Acidic conditions were created without an addition of acid, with a pH of below 1 after 4 hours. A summary of all test results is given in FIG. 15.

What is claimed is:

1. A method of removing filter cake from a subterranean borehole, the method comprising:

drilling a borehole with a drill-in fluid to form a filter cake;

contacting the filter cake with a composition comprising (a) an encapsulated persulfate; and (b) a nonionic surfactant, wherein the encapsulated persulfate is present in an amount from about 0.01 to about 20 weight percent, and the nonionic surfactant is present in an amount from about 0.01 to about 50 weight percent, based on the total weight of the composition, when the composition is introduced into the borehole; and allowing the composition to remain downhole for a period of time sufficient to degrade the filter cake;

wherein the contacting the filter cake with the composition generates acidic conditions, without addition of an acid; and wherein the persulfate chemically breaks down the filter cake via direct oxidation or free radical oxidation.

2. The method of claim 1, further comprising removing the degraded filter cake from the subterranean borehole.

3. The method of claim 1, wherein the composition further comprises a variable density brine.

4. The method of claim 1, wherein at least one component of the composition is mixed with fresh water, brine water, formation water with potassium chloride or other salts added, or combinations thereof, prior to introduction into the subterranean borehole.

5. The method of claim 1, wherein the encapsulated persulfate is selected from the group consisting of encapsulated sodium persulfate, encapsulated potassium persulfate, encapsulated ammonium persulfate, and combinations thereof.

6. The method of claim 1, wherein the encapsulated persulfate is cured acrylic resin encapsulated persulfate.

7. The method of claim 1, wherein the encapsulated persulfate is coated ammonium persulfate.

8. The method of claim 1, wherein the encapsulated persulfate provides a controlled time release of the persulfate.

9. The method of claim 1, wherein the persulfate from the encapsulated persulfate decomposes from a direct reduction reaction, a surface catalyzed reaction, and/or a free radical decomposition reaction.

10. The method of claim 1, wherein:

the nonionic surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof; or the nonionic surfactant is selected from the group consisting of a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof; or the nonionic surfactant is selected from the group consisting of an ethoxylated coco fatty acid, an ethoxylated coco fatty ester, an ethoxylated cocoamide, an ethoxylated castor oil, a monococoate, and combinations thereof; or the nonionic surfactant comprises a sorbitan ester selected from the group consisting of sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7; or the nonionic surfactant comprises an ethoxylated sorbitan ester selected from the group consisting of a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

11. The method of claim 10, wherein the ethoxylated coco fatty acid is a polyethylene glycol (PEG) coco fatty acid having a range of about 5 to about 40 PEG groups, and a Hydrophile-Lipophile Balance (HLB) range from about 10 to about 19; the ethoxylated castor oil is a polyethylene glycol (PEG) castor oil having a range of about 2.5 to about 40 PEG groups, and a Hydrophile-Lipophile Balance (HLB) range from about 2.1 to about 16; the ethoxylated cocoamide is a polyethylene glycol (PEG) cocamide having a range of about 2 to about 20 PEG groups, and a Hydrophile-Lipophile Balance (HLB) range from about 2 to about 19.

12. The method of claim 1, further comprising a chelate, wherein the chelate is selected from the group consisting of a mono-, di-, tri- or tetra-sodium ethylenediaminetetraacetic acid (EDTA), a mono-, di-, tri- or tetra-potassium ethylenediaminetetraacetic acid (EDTA), sodium ethylenediamine-N,N'-disuccinic acid (EDDS), and combinations thereof.

13. The method of claim 1, further comprising a cosolvent, wherein the cosolvent is selected from the group consisting of a terpene, methyl soyate, ethyl lactate, methyl lactate, ethyl acetate, and combinations thereof.

14. The method of claim 1, wherein the encapsulated persulfate and the nonionic surfactant are added simultaneously or sequentially to the composition.

15. The method of claim 1, wherein the composition is applied to the subterranean borehole as, or in combination with, a drilling fluid, treatment fluid, stimulation fluid, fracturing fluid, a fluid used in an enhanced oil recovery technique, or a combination thereof.

16. The method of claim 1, further comprising: allowing the composition to contact blockage or damage in the subterranean borehole, so that the damage or blockage is altered, removed, degraded, and/or dissolved, so that a permeability, a relative permeability, and/or an absolute permeability of the subterranean formation is increased, causing an increase in the production rates and/or recovery of hydrocarbons.

17. A method of removing filter cake from a subterranean borehole, said method comprising:
drilling a borehole with a drill-in fluid to form a filter cake;
contacting the filter cake with a composition comprising (a) an encapsulated persulfate; and (b) a nonionic surfactant; and (c) an unencapsulated persulfate, wherein the encapsulated persulfate is present in an amount from about 0.01 to about 20 weight percent, the nonionic surfactant is present in an amount from about 0.01 to about 50 weight percent, and the unencapsulated persulfate is present in an amount from about 0.01 to about 20 weight percent, based on the total weight of the composition, when the composition is introduced into the borehole; and
allowing the composition to remain downhole for a period of time sufficient to degrade the filter cake;
wherein the contacting the filter cake with the composition generates acidic conditions, without addition of an acid; and
wherein the persulfate chemically breaks down the filter cake via direct oxidation or free radical oxidation.

* * * * *